W. S. WARDEN.
ARTIFICIAL FISH BAIT.
APPLICATION FILED AUG. 30, 1919.

1,380,876.

Patented June 7, 1921.

INVENTOR.
William S. Warden
BY
HIS ATTORNEY

UNITED STATES PATENT OFFICE.

WILLIAM S. WARDEN, OF NEW YORK, N. Y., ASSIGNOR TO BAKER, MURRAY & IMBRIE, INC., OF NEW YORK, N. Y., A CORPORATION OF NEW YORK.

ARTIFICIAL FISH-BAIT.

1,380,876.    Specification of Letters Patent.    Patented June 7, 1921.

Application filed August 30, 1919. Serial No. 320,908.

*To all whom it may concern:*

Be it known that I, WILLIAM S. WARDEN, a citizen of Czecho-Slovakia, and resident of New York, in the county of New York and State of New York, have invented certain new and useful Improvements in Artificial Fish-Baits, of which the following is a specification.

My invention has for its object to provide an artificial bait or lure for either trolling or still fishing, that will prove more attractive to the fish than those now in general use and that will also be of simple and durable construction.

In carrying out my invention I provide a bait which may be of any desired form, but preferably having the general form of a minnow, the body portion of which is formed of glass or other transparent or translucent material and provided with a water-tight chamber containing a luminous or light-producing substance, such, for example as a radium compound, mesothorium, or zinc sulfid. At the opposite ends of this body portion are located the head and tail members which are held in position on the body member by suitable connecting strips, to which latter the hooks may be attached. When the bait or lure thus formed is lowered into the water, the light emanating from the luminous compound in the transparent body of the bait attracts fish in large numbers to the immediate vicinity of the latter where they can be readily caught on the hook or hooks of the bait.

Referring now to the accompanying drawings forming part of this specification—

Figure 1:
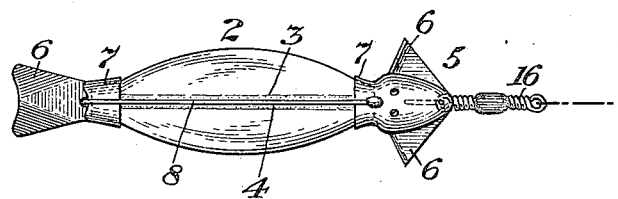
Figure 1 is a plan view of a bait or lure embodying my invention.
Figure 2:
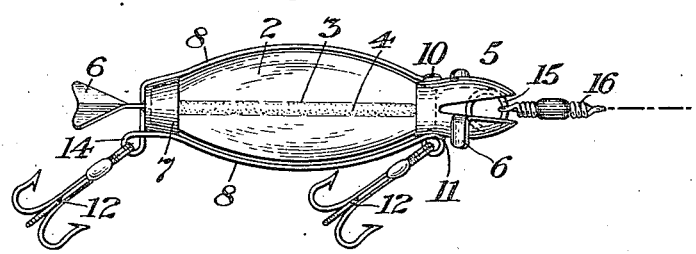
Fig. 2 is a side elevation of the same.

The body of the bait, indicated at 2, may be made of any suitable transparent or translucent material and of any desired form, but I prefer to make it of glass and of a form corresponding generally to that of the body of a minnow or similar small fish, as shown. This body portion is formed with a suitable chamber 3, here shown as extending longitudinally through the center thereof, in which is contained the luminous material 4. In order to properly preserve the latter, its containing chamber is of course suitably sealed to render it water-tight.

Suitably attached to the opposite ends of this body portion 2 are the head and tail members, 5 and 6 respectively, which are preferably made of metal and of a form to maintain the bait in proper position in the water, the head 5 having laterally projecting fins 6 serving this purpose.

As a means for firmly securing the said head and tail members in connection with the body 2, they are each formed with an annular flanged portion 7 to closely fit over the adjacent ends of the body portion, and are held in such position and against longitudinal displacement by means of connections 8, here shown in the form of a single wire or metal strip soldered or otherwise attached at its ends to the head member 5, as at 10 and 11, and from thence extending rearwardly in loop form to and about the tail member as shown. It will be understood of course that any suitable means may be employed for holding these head and tail members in position on the body member without departure from the invention, but the wire shown constitutes a simple, effective and inexpensive means for the purpose, and also provides a convenient means for the attachment of the hooks 12, which latter are here shown as connected with said wire 8 in eyes 14 formed by loops in the wire, as shown.

As a means for attaching the bait to the line, the head is here shown as provided with a ring 15 in the mouth thereof to which is connected the usual swivel line attachment 16.

It will be clear from the foregoing that my invention provides a self-luminous bait or lure, that is inexpensive, durable and highly efficient for the purpose intended.

Having thus set forth my invention, what I claim and desire to secure by Letters Patent is:—

An artificial bait, comprising an elongated body of transparent material having a water-tight chamber, a luminous substance contained in said chamber, head and tail members having annular flanged portions fitted to the opposite ends of said body, a strip connecting said members for holding them in position on the body and formed with loops adjacent its opposite ends and hooks loosely connected with said loops of the strip.

Signed at New York, in the county of New York, and State of New York, this 25th day of August, A. D. 1919.

WILLIAM S. WARDEN.

Witnesses:
 EDNA WARDEN,
 CHARLES SRIPP.